Oct. 15, 1935.  U. A. WHITAKER  2,017,678
FLUID PRESSURE BRAKE
Filed Jan. 9, 1930
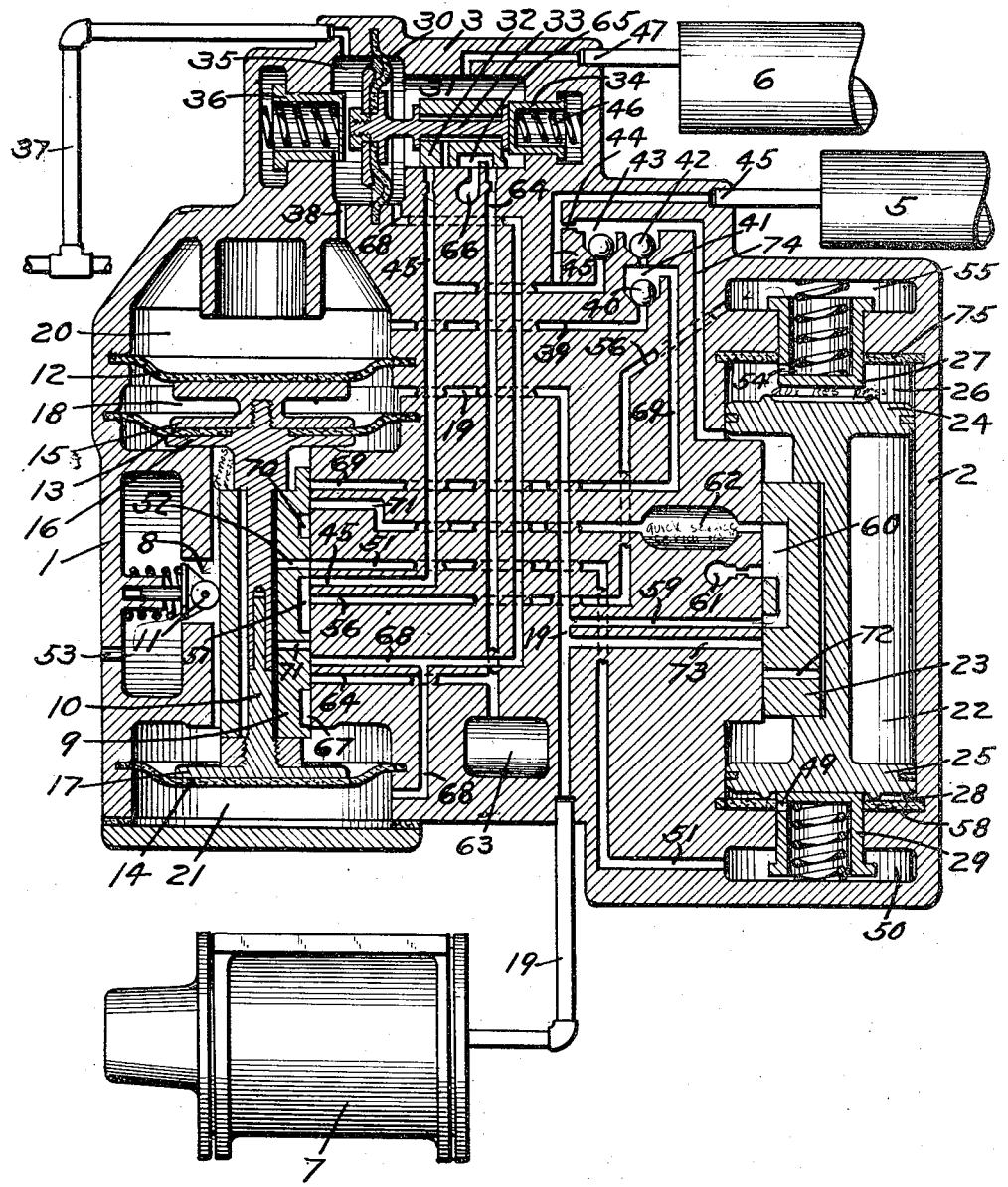
INVENTOR
UNCAS A. WHITAKER
BY
ATTORNEY Patented Oct. 15, 1935

2,017,678

UNITED STATES PATENT OFFICE 2,017,678

FLUID PRESSURE BRAKE

Uncas A. Whitaker, Canton, Ohio, assignor to The Westinghouse Air Brake Company, Wilmerding, Pa., a corporation of Pennsylvania Application January 9, 1930, Serial No. 419,519

11 Claims. (Cl. 303—74)

This invention relates to fluid pressure brakes, and more particularly to a valve mechanism for controlling the application and the release of the brakes on a car.

In Patent No. 1,819,507 of Clyde C. Farmer, issued August 18, 1931, a valve mechanism is disclosed for controlling the brakes on a car, in which valve mechanism a spring is employed for assisting the movement of the operating parts to release position.

The principal object of my invention is to provide a valve mechanism of the above character having improved means for facilitating the movement of the operating parts to the release position in which the use of a spring is dispensed with.

Other objects and advantages will appear in the following more detailed description of my invention.

In the accompanying drawing, the single figure is a diagrammatic view, partly in section, of a fluid pressure brake equipment embodying my invention.

As shown in the drawing, the brake equipment comprises a control valve device 1, a repeater valve device 2, a charging valve device 3, an auxiliary reservoir 5, a control reservoir 6 and a brake cylinder 7.

The control valve device 1 comprises a casing having a valve chamber 8 containing a control slide valve 9, which is carried by a stem 10 and is held to its seat by a spring pressed roller 11, and which is adapted to be operated by spaced flexible diaphragms 12, 13 and 14 secured in the casing.

The flexible diaphragm 13 is clamped between one side of a follower 15, which has screw-threaded connection with the stem 10, and a flange 16 formed on the stem 10 adjacent its upper end, the other side of said follower engaging the underside of flexible diaphragm 12. The lower end of the stem 10 is provided with a flange 17 which engages the upper side of the flexible diaphragm 14.

Intermediate the diaphragms 12 and 13 is a chamber 18, which is in constant communication with brake cylinder 7 through a passage and pipe 19. A chamber 20 is formed at the upper side of diaphragm 12 and a chamber 21 is formed at the lower side of diaphragm 14.

The repeater valve device 2 is preferably associated with the control valve device 1 and comprises a casing having a slide valve chamber 22 containing a slide valve 23, which is adapted to be operated by connected pistons 24 and 25. Extending into chamber 26 at one side of the piston 24 is a spring pressed stop 27 and extending into a chamber 28 at one side of the piston 25 is a spring pressed stop 29. Either stop 27 or 29 is adapted to shift the repeater pistons 24 and 25 and slide valve 23 to an intermediate or lap position when the pressure of fluid in piston chambers 26 and 28 is equal. In the lap position, stop 27 will engage piston 24 and stop 29 will engage the piston 25.

The charging valve device 3 is preferably associated with the control valve device 1 and repeater valve device 2 and comprises a casing in which there is secured a flexible diaphragm 30, a chamber 31 at one side of said diaphragm containing a slide valve 32 which is adapted to be moved by a stem 33 secured at one end to the diaphragm 30. A spring pressed stop 34 is also contained in chamber 31 and is adapted to urge the stem 33 and slide valve 32 to the left. Extending into a chamber 35 at the opposite side of diaphragm 30 is a spring pressed stop 36, which is adapted to be engaged by one end of the stem 33 for controlling the operation of the slide valve 32 as will hereinafter be more fully explained.

In operation, to initially charge the brake equipment, fluid under pressure is supplied to the brake pipe 37 in the usual manner and flows through said brake pipe to diaphragm chamber 35 of the charging valve device 3, and from thence through passage 38 to diaphragm chamber 20 of the control valve device 1. From diaphragm chamber 20, fluid under pressure flows through passage 39, past a ball check valve 40 to a chamber 41, and from thence past a ball check valve 42, through chamber 43, through a restricted passage 44 and passage and pipe 45 to the auxiliary reservoir 5, thereby charging said reservoir with fluid at brake pipe pressure and at the same time the repeater valve chamber 22 is charged by flow of fluid under pressure from chamber 43 through passage 74.

When fluid under pressure is supplied to diaphragm chamber 35 of the charging valve device, the diaphragm 30 is deflected to the right and operates to shift slide valve 32 to charging position in which the spring 46 in stop 34 is compressed and passage 45 is uncovered. Fluid under pressure is thereby permitted to flow from passage 45 to valve chamber 31 and from thence through passage and pipe 47 to the control reservoir 6. When the pressure of fluid in the charging valve chamber 31, acting on the right hand side of diaphragm 30, is thus built up substantially equal to the pressure of fluid in diaphragm chamber 35, the pressure of spring 46 shifts the stop 34 and slide valve 32 to lap position, as shown in the drawing.

Valve chamber 31 of the charging valve device is open to diaphragm chamber 21 of the control valve device 1 through passage 68, and said diaphragm chamber is thus permitted to become charged with fluid at the pressure carried in the control reservoir 6.

Fluid under pressure supplied from the brake pipe to diaphragm chamber 20 deflects diaphragm 12 downwardly, which deflects diaphragms 13 and 14 and moves slide valve 9 to release position, as shown in the drawing. The control valve device is thus operated in initially charging the equipment before diaphragm chamber 21 becomes charged with fluid under pressure as above described. Diaphragms 12 and 14 are of the same area and after the chambers 20 and 21 become charged with fluid at substantially the same pressure, the stress in said diaphragms tends to shift the slide valve 9 upwardly, but the friction between said slide valve and its seat maintains the valve device in the release position.

In release position of the control slide valve, the repeater valve piston chamber 28 is opened to the atmosphere through port 49 in spring pressed stop 29, a chamber 50, passage 51, port 52 in the control slide valve 9, control valve chamber 8 and atmospheric passage 53, and the repeater valve piston chamber 26 is connected to the auxiliary reservoir 5 through port 54 in spring pressed stop 27, chamber 55, passage 56, cavity 57 in the control slide valve 9 and passage 45. Fluid under pressure is thus permitted to flow from the auxiliary reservoir 5 to piston chamber 26 and act on piston 24. With the piston chamber 28 at atmospheric pressure, the pressure of fluid acting on piston 24 shifts the pistons 24 and 25 and slide valve 23 to release position, in which piston 25 engages a gasket 58.

In release position of the repeater slide valve 23, the brake cylinder 7 is opened to the atmosphere through pipe and passage 19, passage 59, cavity 60 in slide valve 23 and atmospheric exhaust port 61. A quick service reservoir 62 is also opened to the atmosphere through cavity 60 and port 61.

With the charging valve device 3 in the release position, as shown in the drawing, a reduction reservoir volume 63 is connected to the atmosphere through passage 64, cavity 65 in slide valve 32, and atmospheric exhaust port 66.

To effect an application of the brakes, the pressure of fluid in the brake pipe 37 is reduced in the usual well known manner, which causes a corresponding reduction in pressure in the charging valve diaphragm chamber 35 and in the control valve diaphragm chamber 20.

Reducing the pressure in the charging valve diaphragm chamber 35 permits the control reservoir pressure in the charging valve chamber 31 to deflect diaphragm 30 to the left until one end of stem 33 engages the stop 36. This movement of the stem 33 shifts the slide valve 32 to a position in which passage 64 is lapped, thereby disconnecting the reduction reservoir volume 63 from the atmosphere.

Since the pressure of fluid in chamber 20 is reduced as the brake pipe pressure is reduced, the higher bottled up pressure in the control reservoir 6, acting in diaphragm chamber 21, operates to shift the diaphragm 14 upwardly and thereby the slide valve 9.

The slide valve 9 is thus moved until cavity 57 connects passage 51 leading from the repeater valve piston chamber 28 to passage 45, which connects with the auxiliary reservoir 5. Fluid under pressure then flows from the auxiliary reservoir to the piston chamber 28. In this position of the control slide valve, passage 56 remains connected to the auxiliary reservoir passage 45, so that fluid at auxiliary reservoir pressure continues to act in the repeater valve piston chamber 26. The fluid pressures in the repeater valve piston chambers 26 and 28 thus being equalized, the spring pressed stop 29 shifts the repeater pistons 24 and 25 and slide valve 23 to lap position, in which the piston 24 just engages the spring pressed stop 27. In lap position of the repeater slide valve 23, the brake cylinder exhaust passage 59 is lapped and the atmospheric connection from the quick service reservoir 62 is cut off.

The control slide valve 9 continues to move upwardly until cavity 70 in said slide valve connects passage 69 to passage 71, which permits fluid under pressure to flow from the brake pipe 37 by way of the control valve diaphragm chamber 20, through passage 39, past ball check valve 40, through chamber 41, passage 69, cavity 70 in the control slide valve, and passage 71 to the quick service reservoir 62. This permits a flow of fluid under pressure from the brake pipe to the quick service reservoir 62, causing a local quick service reduction in brake pipe pressure.

At the same time that cavity 70 connects passages 69 and 71 to effect the above described quick service action, cavity 67 in the control slide valve connects passage 68 leading from the charging valve chamber 31 to passage 64 leading from the reduction reservoir 63. This permits fluid under pressure to flow from the control reservoir 6 and diaphragm chamber 21 of the control valve device to the reduction reservoir 63, thereby causing the pressure in said reservoir and in chamber 21 to equalize into the reduction reservoir. This reduction in pressure in diaphragm chamber 21 occurs at substantially the same rate as the brake pipe pressure is being reduced in the diaphragm chamber 20 and consequently, temporarily stops the further upward movement of the control slide valve 9.

It will here be noted that in effecting an application of the brakes, the control valve slide valve 9 is first moved from release position to lap position in which it is stopped and in which a quick service reduction in brake pipe pressure is effected.

After the control reservoir pressure is equalized into the reduction reservoir 63, no further reduction of control reservoir pressure in diaphragm chamber 21 will occur. Consequently, when the brake pipe pressure in chamber 20 is further reduced below the reduced control reservoir pressure in diaphragm chamber 21, the control slide valve 9 is shifted from the lap position to service position, in which fluid under pressure is vented from the repeater valve piston chamber 26 through passage 56, port 71 in the control slide valve, control valve chamber 8, and atmospheric port 53, while fluid under pressure is still supplied from the auxiliary reservoir 5 to the repeater valve piston chamber 28 through passage 45, cavity 57 in the control slide valve and passage 51. The pressure of fluid in the repeater valve piston chamber 28 then shifts the repeater pistons 25 and 24 and slide valve 23 upwardly to application position, in which piston 24 engages a gasket 75.

In application position of the repeater slide valve 23, port 72 registers with passage 73, so that fluid under pressure flows from the auxiliary reservoir 5 through pipe and passage 45, chamber 43, passage 74, repeater valve chamber 22, port 72, passage 73 and passage and pipe 19 to the brake cylinder 7, thereby applying the brakes.

When the desired reduction in brake pipe pressure has been effected, the usual brake valve device (not shown) is moved to lap position, so as to prevent a further reduction in brake pipe pressure.

Fluid at the pressure supplied to the brake cylinder flows through passage 19 to chamber 18 intermediate diaphragms 12 and 13 of the control valve device and acts on the adjacent faces of said diaphragms. The brake pipe pressure in chamber 20 acts on the opposite face of diaphragm 12, while control reservoir pressure acts on the lower face of diaphragm 14. The effective areas of the diaphragms 12, 13 and 14 are such that when the brake cylinder pressure in chamber 18 is built up to a predetermined degree, say for instance, two and one half pounds for each pound reduction in brake pipe pressure, the control valve device is caused to move to lap position.

When the control valve device moves to lap position, cavity 57 in the control slide valve 9 connects passage 56 leading from the repeater piston chamber 26 to the auxiliary reservoir passage 45. Fluid under pressure then flows to the repeater piston chamber 26. Passage 51 from the repeater piston chamber 28 is still connected to the auxiliary reservoir passage 45, so that the fluid pressures in the repeater piston chambers 26 and 28 are equalized. The pressure of spring pressed stop 27 then shifts the repeater pistons 24 and 25 and slide valve 23 to lap position, in which position the brake cylinder passage 73 is lapped and further flow of fluid under pressure to the brake cylinder 7 is prevented.

A further application of the brakes may be effected by a further reduction in brake pipe pressure which will cause the control valve device and repeater device to be again shifted to application position from their lap positions. Further flow of fluid under pressure will thereby be permitted to the brake cylinder 7 to increase the degree of brake application.

When graduating an application of the brakes, or applying the brakes in steps, as just described, it will be noted that the charging valve device is moved to application position when the brake application is initiated and remains in application position upon further reductions in brake pipe pressure, since the pressure in the control reservoir 6 and in the charging valve diaphragm chamber 31 remains at the pressure due to equalization into chamber 63, while the brake pipe pressure continues to be reduced in diaphragm chamber 35. Since the charging valve device thus remains in application position after the initial portion of brake pipe reduction, and laps the reduction reservoir passage 64, the reduction reservoir is rendered ineffective to further reduce control reservoir pressure and hold back the operation of the control valve device upon succeeding reductions in brake pipe pressure, as occurred during the initial brake pipe reduction.

To recharge the brake equipment and release the brakes, fluid under pressure is supplied through brake pipe 37 to the charging valve diaphragm chamber 35 and control valve diaphragm chamber 20. Fluid under pressure then flows from chamber 29 through passage 39, past ball check valve 40 to chamber 41, and from thence past ball check valve 42, through chamber 43 and passage 44 and passage and pipe 45 to the auxiliary reservoir 5, and also from chamber 43 through passage 74 to the repeater valve chamber 22, thereby recharging the auxiliary reservoir 5 and the repeater valve chamber 22.

When the brake pipe pressure in diaphragm chamber 20 is built up to a pressure slightly greater than the reduced control reservoir pressure in diaphragm chamber 21, the diaphragm 12 is operated to deflect diaphragms 13 and 14 and shift slide valve 9 downwardly to release position, in which flange 16 engages the casing and port 52 in the control slide valve 9 registers with passage 51 from the repeater valve piston chamber 28. Fluid under pressure is thereby permitted to flow from the repeater piston chamber 28 to the atmosphere through passage 51, port 52 in control valve 9, control valve chamber 8 and atmospheric port 53, and fluid under pressure is supplied from the auxiliary reservoir 5 to the repeater piston chamber 26 through pipe and passage 45, cavity 57 in the control slide valve 9 and passage 56.

The pressure of fluid in the repeater piston chamber 26 then shifts the repeater pistons 24 and 25 and slide valve 23 downwardly to release position, in which fluid under pressure is vented from the brake cylinder 7 through pipe and passage 19, passage 59, cavity 60 in the repeater slide valve 23, and atmospheric port 61, thereby releasing the brakes. At the same time fluid under pressure is vented from the quick service reservoir 62 to the atmosphere through cavity 60 and atmospheric port 61.

When the brake pipe pressure in the charging valve diaphragm chamber 35 becomes slightly greater than the reduced control reservoir pressure in valve chamber 31, the diaphragm 30 is deflected to the right, causing slide valve 32 to uncover passage 45, so as to permit fluid under pressure to flow from the auxiliary reservoir 5 to the control reservoir 6 and recharge the control reservoir to the pressure carried in the brake pipe. When the fluid pressures thus become substantially equal on the opposite sides of charging valve diaphragm 30, spring 46 shifts the charging valve slide valve 32 back to the release position shown in the drawing, in which supply passage 45 is lapped and the control reservoir 6 is disconnected from the auxiliary reservoir 5. In the release position of the charging valve slide valve 32, the reduction reservoir 63 is connected to the atmosphere through passage 64, cavity 65 in the charging valve slide valve 32, and atmospheric port 66.

It will here be noted, that when the brakes are applied, the control reservoir pressure in diaphragm chamber 21 is reduced to below the normal brake pipe pressure carried and that in recharging the equipment and releasing the brakes, the control valve device does not move to release position until after the brake pipe pressure is increased to a degree slightly in excess of the reduced control reservoir pressure in diaphragm chamber 21. It is therefore obvious that by reducing the pressure in chamber 21 below that carried in the brake pipe, movement of the control valve device to release position for releasing the brakes is ensured, whereas if the control reservoir pressure were not reduced, the control valve device would not be returned to release position.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In combination, a valve device for controlling the brakes on a car, a control reservoir associated with said valve device, and a brake pipe, said valve device being movable by the pressure of fluid in said control reservoir upon a reduction in brake pipe pressure to a position for effecting a reduction in brake pipe pressure and for reducing the pressure in said control reservoir to stop the operation of said valve device, and movable to another position by the reduced pressure in said control reservoir, upon a further reduction in brake pipe pressure, to apply the brakes.

2. In combination, a valve device for controlling the brakes on a car, a control reservoir associated with said valve device, and a brake pipe, said valve device being movable by the pressure of fluid in said control reservoir upon a reduction in brake pipe pressure to a position for effecting a quick service reduction in brake pipe pressure and for also effecting a predetermined reduction in the pressure in said control reservoir to temporarily stop the operation of said valve device and movable to another position by the reduced pressure in said control reservoir upon a further reduction in brake pipe pressure to apply the brakes.

3. In combination, a valve device for controlling the brakes on a car, a control reservoir associated with said valve device, and a brake pipe, said valve device being movable by the pressure of fluid in said control reservoir upon a reduction in brake pipe pressure to a position for effecting a quick service reduction in brake pipe pressure and for also reducing the pressure in said control reservoir to substantially that of the reduced brake pipe pressure to stop the movement of said valve device and movable to another position by the reduced pressure in said control reservoir, upon a further reduction in brake pipe pressure, to apply the brakes.

4. In a fluid pressure brake, the combination with a brake pipe and a control reservoir, of a valve device movable by the opposing pressures of said brake pipe and control reservoir for controlling the brakes and adapted when causing an application of the brakes to be effected to effect a reduction in control reservoir pressure to permit a release of the brakes upon an increase in brake pipe pressure, a reservoir for limiting the degree of said reduction in control reservoir pressure, and means movable upon a reduction in brake pipe pressure to close an atmospheric connection from said reduction reservoir and movable only when the brake pipe is charged with fluid at substantially the pressure normally carried to open said atmospheric connection.

5. In a fluid pressure brake, the combination with a brake pipe and a control reservoir, of a charging valve device for supplying fluid under pressure from said brake pipe to said control reservoir, a reduction reservoir normally connected to the atmosphere through said charging valve device and disconnected from the atmosphere by said charging valve device upon a reduction in brake pipe pressure, and a control valve device subject to the opposing pressures of the brake pipe and said control reservoir and movable by the control reservoir pressure upon a reduction in brake pipe pressure to effect an application of the brakes and to connect said control reservoir to said reduction reservoir for effecting a predetermined reduction in control reservoir pressure, said control valve device being movable by an increase in brake pipe pressure above the reduced control reservoir pressure to effect a release of the brakes.

6. In a fluid pressure brake, the combination with a brake pipe and a control reservoir, of a charging valve device for supplying fluid under pressure from said brake pipe to said control reservoir, a reduction reservoir normally connected to the atmosphere through said charging valve device and disconnected from the atmosphere by said charging valve device upon a reduction in brake pipe pressure, and a control valve device subject to the opposing pressures of the brake pipe and said control reservoir and movable by the control reservoir pressure upon a reduction in brake pipe pressure to lap position for effecting a quick service reduction in brake pipe pressure and for connecting said control reservoir to said reduction reservoir to permit a predetermined reduction in control reservoir pressure to be effected, said control valve device being movable from lap position to application position upon a reduction in brake pipe pressure below the reduced control reservoir pressure for causing the brakes to be applied and movable upon an increase in brake pipe pressure above the reduced control reservoir pressure to cause the brakes to be released.

7. In a fluid pressure brake, the combination with a brake pipe, and brake cylinder, of a reservoir normally charged with fluid under pressure, a valve device having flexible diaphragms subject to the pressures of the brake pipe, the brake cylinder and said reservoir and operated upon a reduction in brake pipe pressure for causing an application of the brakes to be effected, a reduction reservoir, and means operated upon a reduction in brake pipe pressure for connecting said normally charged reservoir to said reduction reservoir, to thereby reduce the pressure in said charged reservoir.

8. In a fluid pressure brake, the combination with a brake pipe, an auxiliary reservoir and a control reservoir, of a charging valve device operative upon an increase in brake pipe pressure to establish a communication through which fluid under pressure is supplied to said control reservoir and operative to close said communication upon substantial equalization of the control reservoir and brake pipe pressures, means operative to effect the application and release of the brakes, and a control valve device subject to the opposing pressures of said brake pipe and control reservoir and operative by control reservoir pressure upon a reduction in brake pipe pressure to reduce the pressure in said control reservoir and to effect the operation of said valve means to supply fluid under pressure from the auxiliary reservoir to effect an application of the brakes, said control valve device being operative upon an increase in brake pipe pressure over the reduced control reservoir pressure for effecting the operation of said valve means to cause a release of the brakes and for supplying fluid under pressure to said auxiliary reservoir.

9. In a fluid pressure brake, the combination with a brake pipe, of a valve device for controlling the brakes comprising a movable abutment subject to the opposing pressures of the brake pipe and a chamber, valve means movable by said movable abutment upon a reduction in brake pipe pressure first to a position to effect a quick service reduction in brake pipe pressure and then to a position for effecting an application of the brakes, and means operating in the quick service position for effecting a limited reduction in pressure in said chamber to delay the movement of said valve device to application position.

10. In a fluid pressure brake, the combination with a brake pipe and a chamber normally charged with fluid under pressure, of valve means controlled by the opposing pressures of said brake pipe and chamber and operative upon a reduction in brake pipe pressure to first effect a reduction in pressure in said chamber and to then effect an application of the brakes, and operative upon an increase in brake pipe pressure over the reduced pressure in said chamber to effect a release of the brakes, and means operative to limit the reduction in pressure in said chamber to a degree sufficient to provide the required differential to operate said valve means to effect a release of the brakes when the brake pipe pressure is restored to the normal pressure carried.

11. In a fluid pressure brake, the combination with a brake pipe, a chamber normally charged with fluid under pressure, and a reduction limiting reservoir, of valve means controlled by the opposing pressures of the brake pipe and said chamber and operative upon a reduction in brake pipe pressure to vent fluid under pressure from said chamber only to said reduction limiting reservoir and to concurrently vent fluid under pressure from said brake pipe to effect a quick service reduction in brake pipe pressure, said valve means being operative by the reduced pressure in said chamber after substantial equalization of pressures in said chamber and reservoir and upon further reduction in brake pipe pressure below said reduced pressure to effect an application of the brakes.

UNCAS A. WHITAKER.